Dec. 31, 1963   V. L. OTT ETAL   3,116,073
TRICYCLE STRUCTURE
Filed April 17, 1962   2 Sheets-Sheet 1
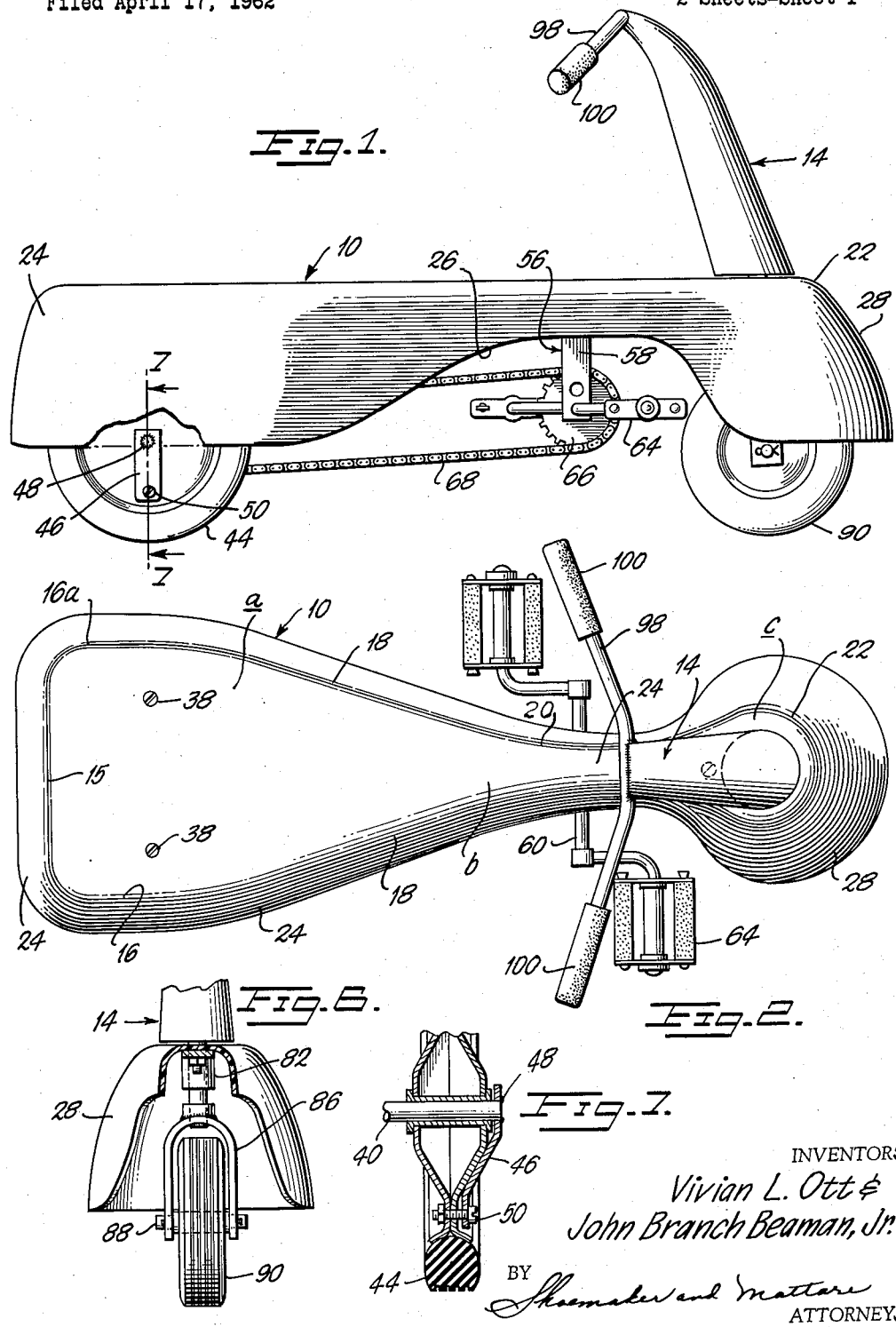
INVENTORS
Vivian L. Ott &
John Branch Beaman, Jr.
BY
Shoemaker and Mattare
ATTORNEYS

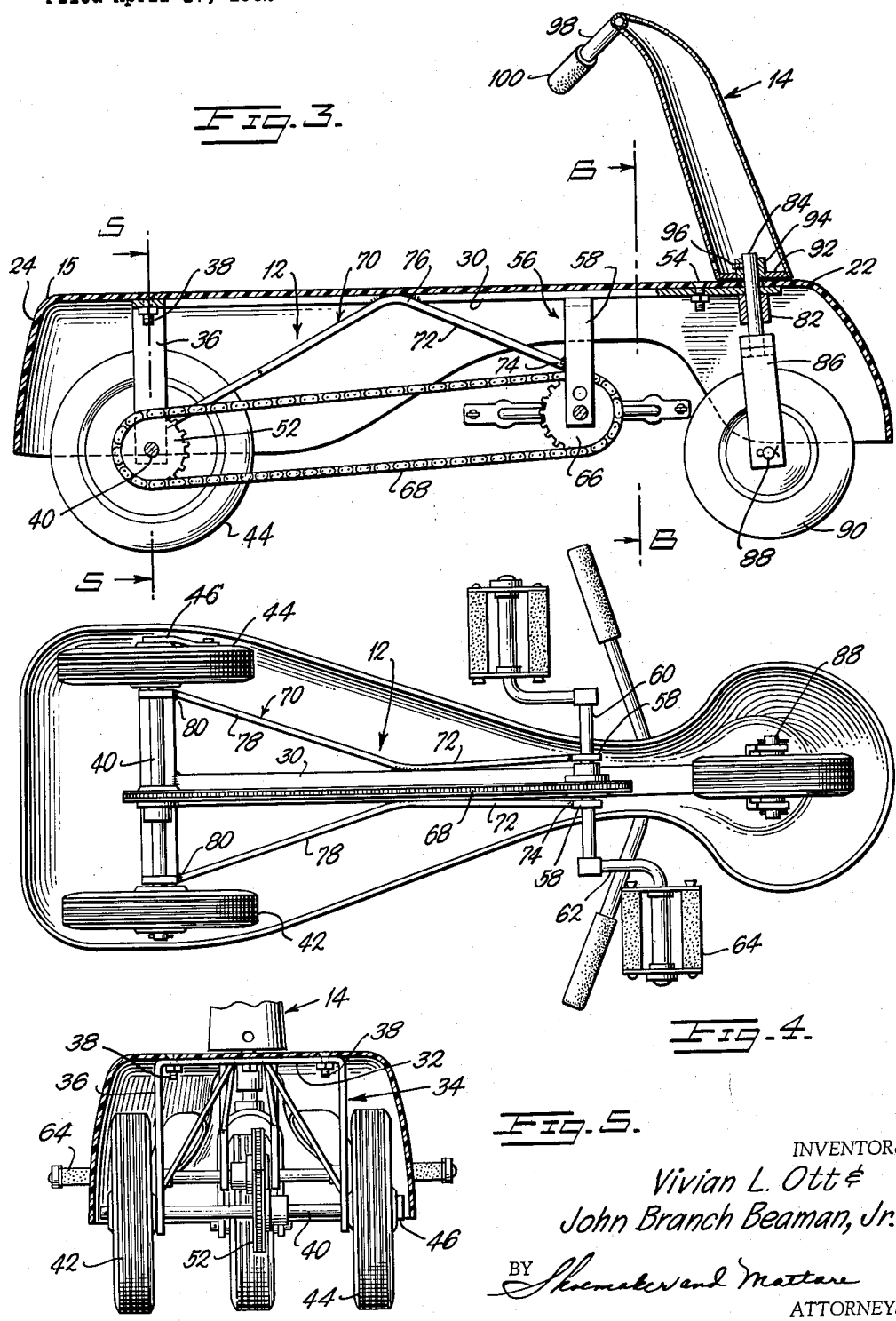

United States Patent Office 3,116,073
Patented Dec. 31, 1963

3,116,073
TRICYCLE STRUCTURE
Vivian L. Ott, 6100 Sylvan Ave., Norfolk, Va., and
John Branch Beaman, Jr., 815 Church St.,
Ahoskie, N.C.
Filed Apr. 17, 1962, Ser. No. 188,132
8 Claims. (Cl. 280—261)

This invention relates generally to improvements in tricycles, and is directed particularly to an improved tricycle structure designed to be used by young growing children.

Tricycles as conventionally constructed for use by children embody a frame having a front part supported by a single steerable wheel with means connected therewith for turning the wheel for effecting the steering movement, a pair of transversely spaced rear wheels, a seat above the rear wheels and pedal means operatively connected with the rear wheels whereby a child mounted on the seat can operate the pedals to drive the cycle.

As is well known, tricycles are manufactured in a number of different sizes so that one of a proper size suitable to a child of a particular age may be obtained. After the child has had the tricycle for a short period of time he finds that it is no longer easy to manipulate the pedals when he is mounted on the seat. Even though the seat may be adjustable to accommodate the leg length of the child, this does not enable the child to go on using the tricycle over a period of years with any degree of comfort due to the fact that changing the height of the seat makes it necessary for the child to stretch his legs out straighter in order to reach the pedal.

In view of the foregoing a principle object of the present invention is to provide a new tricycle construction wherein there is provided a seat forming body extending the full length of the tricycle structure and providing an elongate seat forming surface extending through the major portion of the length of the structure and designed in a novel manner or having a novel configuration such that a child can be seated comfortably thereon and can comfortably reach the wheel operating pedals when he is at a tender age and can readily shift his position rearwardly with respect to the pedals as he grows older and still maintain a comfortable seating and can comfortably reach and operate the pedals.

In other words the novel construction of the tricycle seat body of the present invention is such that when the child is little and his legs are short he can sit forwardly on the seat substantially directly above the pedals, and as he grows older and his legs grow longer, he can move back on the seat and still maintain a comfortable footing upon the operating pedals.

In addition to the foregoing it is a particular object of the invention to provide a seat body wherein the stated object may be accomplished and wherein the width of the seat gradually increases from a forward location adjacent to the pedals, to the rear end of the tricycle structure to comfortably adapt to the changing physical dimensions of the child's body.

A still further object of the invention is to provide a tricycle structure of a character to accomplish the above stated objects, wherein the seat body in addition to providing the elongate top seating surface and which surface is continued forwardly beyond the operating pedal to cover the front steering wheel, is skirted to form a casing or housing which encloses the major part of the underlying frame structure.

A still further object of the invention is to provide in a tricycle of the character stated, a novel frame structure or frame unit to which the seat forming body or seat unit may be easily and quickly attached so that the assembly of the structure may be accomplished with a minimum of labor.

A still further object of the invention is to provide a tricycle structure in which there is embodied a novel form of steering post and novel means for attaching the same to or connecting the same with the front or third wheel of the tricycle.

A still further object of the invention is to provide a novel driving coupling between a rear axle of the tricycle and a rear wheel.

The invention will be best understood from a consideration of the following detailed description taken in connection with the accompanying drawings, wherein:

FIG. 1 is a view in side elevation of a tricycle constructed in accordance with the present invention, with a portion of the body skirt on one side broken away to show the connection between the rear axle and the near wheel.

FIG. 2 is a top plan view of the tricycle.

FIG. 3 is a longitudinal sectional view taken in a vertical plane and showing portions of the frame in elevation, and other portions in section.

FIG. 4 is a view in bottom plan of the tricycle structure.

FIG. 5 is a sectional view taken in a vertical plane extending transversely of the tricycle structure, substantially on the line 5—5 of FIG. 3.

FIG. 6 is a transverse section taken in a vertical plane transversely of the tricycle structure substantially on the line 6—6 of FIG. 3.

FIG. 7 is a sectional detail taken substantially on the line 7—7 of FIG. 1 illustrating the coupling between the rear axle and one wheel.

Referring now more particularly to the drawings it will be seen that the tricycle structure of the present invention embodies two major parts or units which are the body unit, which is generally designated 10, and the framework unit, which carries the supporting wheels and which is generally designated 12.

The steering post, which may be considered a part of the framework or frame unit, is generally designated 14, and is operatively and detachably coupled to the wheel carrying framework in the manner hereafter particularly described.

The body unit 10 is preferably formed in one piece or as a single unit as illustrated. Such body unit may be fabricated from any suitable material, preferably a material which can be readily molded and which may comprise a synthetic resin of suitable character and of a type which will withstand shocks without breaking, or the body may be formed of fiber-glass which is particularly well suited for use in a structure of the character under consideration, due to its well-known high strength or shock resisting qualities.

Viewing the body structure 10 from the top, as, for example, in FIG. 2, it will be seen that it may be described as embodying three portions which are designated a, b, and c.

The portions a and b, together comprise the seating surface, and it will be seen that the portion which is at the rear end of the tricycle structure, is of substantial width, this being the widest part of the seating surface, and is defined by the transverse rear rounded boundary portion 15, which, at each side of the seat, merges into the short substantially straight and also substantially parallel forwardly extending boundary portion 16, and these boundary portions then flow into the long forwardly extending and forwardly converging transversely rounded boundary portions 18. The boundary or marginal portions 18, at the forward ends thereof form the narrow width neck part 20 and then flow into or join the boundary or marginal portion 22 of the forward part c of the body. This boundary or margin 22 is here shown as imparting a substantially circular form to the forward part c.

As will be readily seen upon reference to FIGS. 1 and 3, the entire area bordered by the marginal or boundary parts or edges, which are rounded as is clearly illustrated, is flat or plane.

Extending downwardly from the boundary or marginal portions 15, 16, 18 and 22, is a relatively deep skirt which is generally designated 24, and which is flared as shown.

In the area of the neck part 20 the skirt is cut-away or recessed as at 26, on each side of the body to provide clearance for the pedal cranks and crankshaft.

At the forward end of the body the flare of the skirt is somewhat increased and since it extends downwardly from the substantially circular margin or boundary edge 22, it will be seen upon reference to FIGS. 2 and 4, that there is thus provided a substantially circular hood forming a cover or housing for the front steering wheel.

The body supporting frame unit 12 comprises a central longitudinally extending bar 30 which is flat and of relatively narrow width and which forms the backbone of the frame structure and is secured directly against the underside of and upon the longitudinal center of the body 10.

The bar 30 is rigidly secured at its rear end to the straight transverse central portion 32 of an inserted substantially U-shaped bracket 34, and which bracket includes the spaced parallel depending legs 36. The portion 32 thus forms a connecting yoke between the legs 36 and this yoke extends in a transverse direction of the seat or is perpendicular to the longitudinal bar 30 and is secured to the underside of the portion a of the seat by bolts 38.

The depending bracket 34 supports the transversely extending rear axle 40 which has its end portions extending through suitable openings in the lower ends of the legs 36, to rotate therein.

The axle 40 has mounted upon the ends thereof, upon the outer sides of the legs 36, the wheels 42 and 44. One of these wheels, for example, wheel 42, may be mounted for free rotation on the axle, while the other wheel is connected to the axle in a novel manner so that when the axle is forced to rotate by the pedal mechanism hereinafter described, rotation will also be given to this wheel 44.

The means illustrated for positively coupling the wheel 44 with the axle 40, comprises a short crank arm 46 which is rigidly secured, as by welding or the like, as indicated at 48, to the outer end of the axle 40. This crank arm 46 extends radially of the outer side of the wheel 44 and is detachably connected to the wheel by the screw 50 as shown in FIGS. 1 and 7.

The shaft 40 has fixed thereon, approximately mid-way between the bracket legs 36, a sprocket gear 52.

The forward end of the bar 30 is secured to the body 10 by the bolt 54.

At approximately the neck part of the body or narrowest part thereof, the bar 30 has secured thereto, the inserted depending U-shaped bracket 56. The numerals 58 designate the two spaced parallel leg portions of this bracket 56 and the lower free ends of these legs or leg portions, have extending therethrough, the crankshaft 60. This crankshaft is supported for free rotation in openings in the ends of the legs 58 and each end of the shaft 60 has secured thereto, a crank 62 which carries a pedal 64 of the type conventionally employed upon tricycles, whereby rotation may be imparted to the cranks and the crankshaft by the feet of the person mounted on the seat.

The numeral 66 designates the front sprocket gear which is mounted on and secured to the shaft 60 and is located between the bracket legs 58. This sprocket gear is operatively coupled by the sprocket chain 68 with the rear sprocket gear 52 as illustrated.

The numeral 70 designates a pair of arched bracing struts. These struts are located on opposite sides of the bar 30 as shown in FIG. 4, and as clearly shown in FIG. 2, each strut has a downwardly extending forward end portion 72 which is rigidly secured, as at 74, to a bracket leg 58.

The point or apex of each of the arched struts is secured by welding or in any other suitable manner to the adjacent side of the bar 30 as indicated at 76, and from this point each strut has a rearwardly and downwardly extending portion 78, which also extends laterally, which is rigidly secured as by welding or the like, at 80 to a leg 36 of the rear axle supporting bracket 34.

The forward end of the frame bar 30 has secured to the underside thereof, a substantially vertical bearing sleeve 82. This bearing sleeve has extending upwardly therethrough a kingbolt 84, the lower end of which is fixed to a downwardly extending fork 86. This fork carries the short transverse pivot pin 88 upon which is rotatably mounted the front steering wheel 90.

As shown the steering post 14 is in the form of an upwardly tapering hollow body, in the lower end of which is secured a plate 92 and this plate carries upon its upper side within the hollow post, a collar 94 into which the upper end of the kingbolt extends, and where it is secured by a set screw 96 in the manner illustrated. The collar 94 is rigid with the plate 92 and thus upon rotation of the column, the steering wheel 90 will also be rotated.

The top end of the steering column or post as secured thereto and extending transversely thereof the handle bars 98, the outer end of each of which has a hand grip 100 thereon.

From the foregoing it will be seen that there is provided by the present invention a novel tricycle structure wherein the body which is formed preferably in a single unit, is mounted upon and extends the full length of the supporting frame unit and wherein such body provides a long flat top surface for use as a seat and and which seat, because of its novel configuration, will enable a child to comfortably use or operate the tricycle for a number of years by enabling the child to continuously and progressively readjust his seating position on the body as he grows taller as he can draw his legs up or straighten them out to adjust to the most comfortable position for the placing of his feet upon the pedals and the operation of the latter.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A tricycle structure comprising an elongate body unit, an elongate frame unit and supporting wheels carried by the frame unit, said elongate body unit having a long longitudinally extending plane top seat forming surface, said top surface having a rear end portion of major width extending for a part of the length of the surface from the extreme rear thereof and then gradually decreasing in width through a greater longitudinal extent of the surface to a relatively narrow width at the mid-portion of the body unit, said rear end portion of said top surface and said narrow width portion of the top surface forming said long plane seat surface, said body unit resting on and extending longitudinally of the frame unit, means connecting the supporting wheels to the frame unit, one of said wheels being located adjacent to the forward end of the body unit and being connected to the body unit for steering turning movement, steering means connected with the last mentioned wheel, and said body unit including an integral surrounding downwardly and outwardly flaring skirt portion, the said long flat top surface having a defining margin and said skirt portion being continuous with and joining the said top surface along said margin.

2. The invention according to claim 1, wherein the said top surface at the forward end of the body terminates in a substantially circular area and wherein the said continuous skirt portion extends downwardly from and around the circular area to form a protective hood over and around and enclosing a substantial portion of the steering wheel at the front and sides of the latter.

3. In a tricycle, an elongate body formed in one continuous piece of material, said body having a longitudinal flat top surface, said top surface having a periphery defining a short longitudinally extending portion of major width, gradually decreasing in width toward one end of the body to form an intermediate portion having a relatively narrow minimum width midway of the ends of the body and terminating in a forward end portion, said intermediate portion being of materially greater length than the portion of major width, the body having an encircling skirt portion joining and extending downwardly from the said periphery of the longitudinal flat top surface, a wheeled supporting frame having a top part secured to the underside of the body below said longitudinal top surface, means for steering a wheel of said supporting frame, the said short portion and the said intermediate portion of the said top surface forming a rider supporting seat, a shaft rotatably supported by and extending transversely of said supporting frame below the said minimum width portion of said top surface, the shaft having cranks and foot pedals at the ends thereof, a rear transversely extending axle carried by the supporting frame, wheels carried by said axle, a driving connection between said shaft and said axle, and a driving connection between said axle and one of the wheels thereon which comprises a short crank member rigidly secured to the axle and extending radially of and adjacent to a side of a wheel, and means connecting said short crank to the adjacent wheel.

4. In a tricycle, an elongate body formed in one continuous piece of a moldable material, said body having a longitudinal flat top surface, said top surface having a periphery defining a short longitudinally extending portion of major width gradually decreasing in width toward one end of the body to form an intermediate portion having a relatively narrow minimum width mid-way of the ends of the body and terminating in a forward end portion, said intermediate portion being of materially greater length than the portion of major width, the body having an encircling skirt portion joining and extending downwardly from the said periphery of the longitudinal flat top surface, an elongate supporting frame for said body comprising a bar positioned longitudinally of the underside of the body below said longitudinal top surface, a depending bracket secured to the rear end portion of said bar, an axle rotatably carried by said bracket and extending transversely of the body, wheels mounted on said axle, means securing at least one of the wheels to the axle to turn therewith, a steering fork rotatably supported upon the forward end of said bar and extending downwardly therefrom, a kingbolt carried by the steering fork and extending upwardly through the said forward end portion of the said flat top surface of the body, a steering post secured to said kingbolt, handle bars carried by said steering post, a steering wheel rotatably supported in said fork, a crankshaft rotatably supported by said bar transversely with respect to said body below the forward end of the said intermediate portion of the top surface, pedal carrying operating cranks on said shaft, and a driving connection between said shaft and said axle.

5. The invention according to claim 4 wherein said driving connection comprises a sprocket gear on the axle, a sprocket gear on the shaft, and a sprocket chain connecting said gears.

6. The invention according to claim 4 wherein said depending skirt portion covers the major portion of the steering wheel at the front and sides thereof and also covers the major portion of the axle carried wheel at the sides and rear of the latter, and the skirt at opposite sides of the body has recesses therein providing clearance for the pedal cranks.

7. A wheeled toy comprising an elongate one-piece body having a longitudinally extending plane top, said plane top having a rear end and a forward end and forming a seating surface from said rear end through a major portion of the length thereof, the said one-piece body further including a surrounding depending skirt outlining said seating surface, a supporting frame structure secured to the underside of said top of the body, a transverse rear axle rotatably carried by said frame structure, wheels supported upon said axle, a transversely extending crank shaft supported at the underside of the body at the forward end of said seating surface, foot pedals carried by said crank shaft, a driving connection between said crank shaft and said rear axle, a crank member having an end secured to said rear axle at one side of a wheel and having another end secured to the adjacent wheel, a steering wheel rotatably supported beneath the forward end of the body for rotation on a horizontal axis and for steering rotation about an upright axis, a handlebar carrying post rising from the forward end of said body and operatively connected with said steering wheel for turning the latter, and said depending skirt fully encircling the rear wheels and the steering wheel and enclosing all of the wheels through substantially the entire upper half portions thereof.

8. The invention according to claim 7, wherein a king bolt provides an operative coupling between the steering wheel supporting means and the said body and projects upwardly through the top of said body and said steering post is tubular and has a lower end closed by a plate member lying in close proximity to the said top of the body, said plate member carrying an upstanding sleeve lying within the lower end of the hollow post and having the upper end of said king bolt extending thereinto, and means securing the said sleeve and the upper end of the king bolt together.

References Cited in the file of this patent

UNITED STATES PATENTS

| | | |
|---|---|---|
| D. 96,636 | Van Doren et al. | Aug. 30, 1945 |
| 1,738,110 | Meyers | Dec. 3, 1929 |
| 1,748,566 | Furman | Feb. 25, 1930 |
| 1,750,547 | Taylor | Mar. 11, 1930 |
| 2,755,095 | Douglas et al. | July 17, 1956 |
| 2,928,682 | Spencer et al. | Mar. 15, 1960 |
| 2,948,551 | Du Vall | Aug. 9, 1960 |
| 3,039,791 | Horowitz et al. | June 19, 1962 |

FOREIGN PATENTS

| | | |
|---|---|---|
| 512,175 | Great Britain | Aug. 30, 1939 |